April 28, 1970   H. A. MAUCH   3,508,587
TUBULAR STRUCTURAL MEMBER
Original Filed Sept. 8, 1964   2 Sheets-Sheet 2

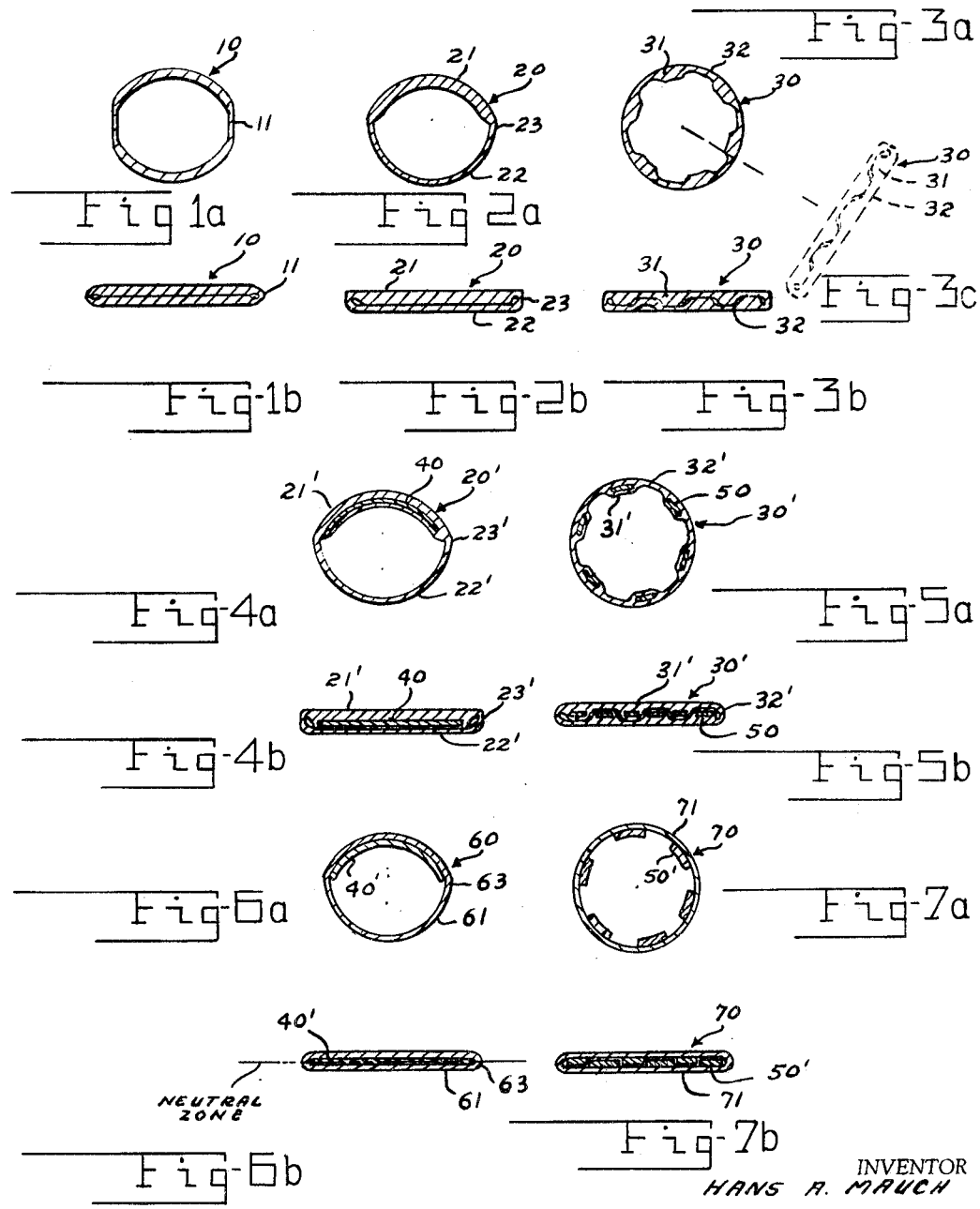

INVENTOR
HANS A. MAUCH
BY Tom Walker
Jerome P. Bloom
ATTORNEYS

United States Patent Office 3,508,587
Patented Apr. 28, 1970

3,508,587
TUBULAR STRUCTURAL MEMBER
Hans A. Mauch, 421 Judith Drive,
Dayton, Ohio 45429
Continuation of application Ser. No. 394,915, Sept. 8, 1964. This application Sept. 29, 1966, Ser. No. 584,325
Int. Cl. F16l 11/06, 11/08, 11/12
U.S. Cl. 138—119           17 Claims

ABSTRACT OF THE DISCLOSURE

A storable and extendable structural support medium comprising an elongated tubular member which is structurally rigid in an axial sense in its elongated tubular form and consists of a circumferentially continuous wall structure which is subject to flattening anywhere along its length in response to a predetermined compressive force being applied transverse to its longitudinal axis, portions of said wall structure adapting to provide diametrically opposite hinges to accommodate repeated flattening and repeated return to its elongated tubular form in a manner to avoid structural deterioration and to enable that the flattened portions of the member may be readily bent or twisted as needs require.

---

This application is a continuation of application Ser. No. 394,915 filed Sept. 8, 1964, and now abandoned.

This invention relates to novel structural members having inherently tubular form which are economical to fabricate, most efficient and satisfactory in use, and adaptable to an unusually wide variety of applications. Embodiments feature high resistance to forces which normally induce bending, buckling and torsion. They are nevertheless characterized by the capability of being compressed flat and, in that state, wrapped about a relatively small radius or twisted about their longitudinal axis.

The invention also contemplates that the aforementioned structural members may incorporate elements which lend such members additional physical and functional characteristics. These elements are integrated in a manner that they do not reduce the basic capacity of such members to compress flat, wrap about a relatively small radius or twist, and, on release from compression, reassume a tubular form.

A primary object of the invention is to provide novel elements of manufacture which inherently assume a tubular form and have the capacity to be compressed flat and, in that state, to wrap about a relatively small radius or twist about their longitudinal axis.

Another object of the invention is to provide elements of the type described which have a minimal increase in width when compressed flat.

A further object of the invention is to provide a structural element of the type described fabricated of material having a relatively low elasticity modulus and high tensile strength.

A further object of the invention is to provide an elongated tubular element which is circumferentially continuous, capable of being compressed flat and bent about a relatively small radius but which nevertheless, in its extended form, has high resistance to bending, buckling and torsion.

Another object of the invention is to provide a structural element having an inherently tubular form which includes diametrically opposite, longitudinally extending hinge portions facilitating that it be compressed flat.

A further object of the invention is to provide a tubular member of the type described including elements having different physical characteristics which are incorporated in a manner to minimize their influence on the normal capability of the member to be wrapped, in its flattened state, about a relatively small radius.

Another object of the invention is to provide a tubular member of the type described so modified to enable its use as a push-pull control element which utilizes the natural physical characteristics of the member per se.

An additional object of the invention is to provide tubular structural elements of the type described which enable a great variety of collapsible and extendable articles of manufacture and provide such articles with an unusually high resistance to bending, buckling and torsion.

Another object of the invention is to provide a novel structural element which enables ready modification of its configuration without deterioration of its basic physical characteristics and use thereof for a great variety of functional devices.

Another object of the invention is to provide elements of manufacture possessing the advantageous structural features, the inherent meritorious characteristics and the means and mode of use herein described.

With the above and other incidental objects in view as more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein are shown some but obviously not necessarily the only forms of embodiment of the invention, FIG. 1a illustrates a cross section of an element of manufacture in accordance with the invention having an inherently tubular state;

FIG. 1b shows the element of FIG. 1a compressed flat;

FIG. 2a illustrates a cross section of a further embodiment of the invention affording a tubular structural element having a form which endows it with a particularly high resistance to bending, buckling and torsion;

FIG. 2b shows the element of FIG. 2a compressed flat;

Figure 8A:
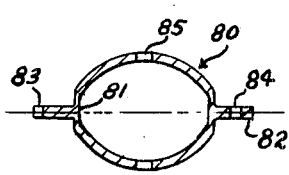
Figure 10A:
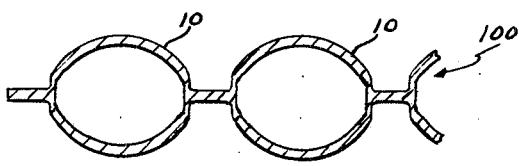
Figure 8B:
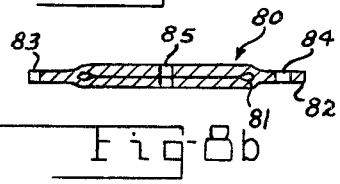
Figure 11A:
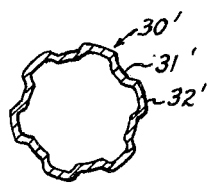
Figure 9:
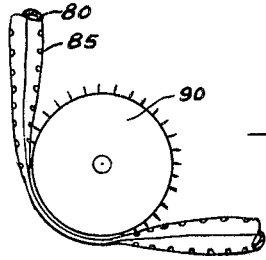
Figure 11B:
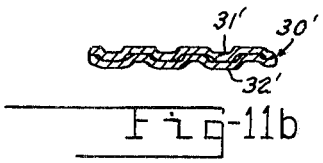
Figure 12A:
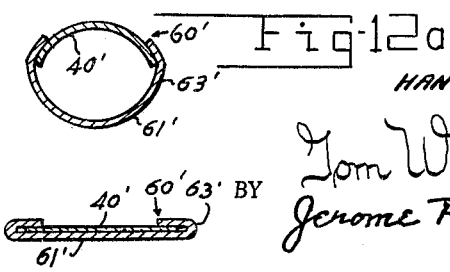

FIGS. 3a, b, and c illustrate, in cross section, a structural element as provided by the present invention which is so formed to enable it to be compressed flat in a plurality of planes;

FIGS. 4a and b illustrate, in cross section, a modification of the device shown in FIGS. 2a and b;

FIGS. 5a and b illustrate a modification of the device as shown in FIGS. 3a and b;

FIGS. 6a and b show, in cross section, another form of embodiment of the invention, as do FIGS. 7a and b;

FIGS. 8a, b and c schematically illustrate how the basic invention embodiments may be variously converted to serve as control elements;

FIG. 9 illustrates an application of a device enabled by a modification shown in FIGS. 8a, b and c;

FIGS. 10a, b and c show a further embodiment of the invention;

FIGS. 11a and b illustrate a modification of the embodiment shown in FIGS. 3a, b and c; and FIGS. 12a and b illustrate a modification of FIGS. 6a and b.

Like parts are indicated by similar characters of reference throughout the several views.

As evidenced in FIG. 1a of the drawings, the invention basically provides a structural element 10 of inherently tubular form. In cross section the element 10 has a uniform wall thickness save for diametrically opposite, relatively thin wall portions 11. The wall portions 11 provide longitudinally extending hinge sections which inherently facilitate that under compression the tube 10 may be compressed flat, as shown in FIG. 1b. Note that in its flat state the lateral width of the element 10 is only approximately 50% greater than its width in the tubular state.

The tube 10 is preferably fabricated of material having a relatively low elasticity modulus in the range of 1 to $5 \times 10^5$ p.s.i. and a tensile strength of several thousand p.s.i. A typical material is a plastic such as polypropylene.

The element 10, when formed as described and of the preferred material, can be readily compressed flat in a plane defined by it hinge portions 11 and has an inherent tendency, when released from compression, to spring to a tubular form. It is a characteristic of this element that it can, in its flat state, be fully wrapped around a relatively small radius or twisted about its longitudinal axis. At the same time, when in an extended position and a natural uncompressed state, its physical properties are such to provide it with high resistance to bending, buckling and torsion. As indicated, the element 10 is basically continuous in a circumferential sense.

Thus, the element 10 may be compressed flat, wrapped to occupy a minimal space and, when released, may provide a uniquely rigid structure. Such element may serve per se as a structural member and/or embody other elements to enable it to serve a great variety of purposes as will become more evident as the description progresses.

To achieve a tubular element of manufacture such as described which has an even greater stiffness when in an extended state, the invention provides a variation of tube wall thickness around the circumference, as shown in FIGS. 2a and b of the drawings. The tubular element 20 there shown is fabricated of the specified material and comprised of a pair of longitudinally extended, transversely arcuate, wall sections 21 and 22. In the example illustrated the section 21 has a thickness approximately twice that of the section 22.

The wall sections 21 and 22 are integrally connected so as to provide a tubular element which is circumferentially continuous. So connected, their relatively adjacent extremities inherently define generally diametrically opposed hinge portions 23. It is noted that, for purposes of comparison, this form of tubular element was given, in cross section, the same amount of material as the member 10. In spite of this, it was found that due to the unequal thicknesses of its opposed wall portions its stiffness in an extended condition was substantially greater than that of member 10. This is achieved without impairment of the inherent flexing, wrapping and twisting properties in the flat state, because these properties depend chiefly on the total thickness of the flattened member which is the same in FIGS. 1 and 2.

Some applications of the invention concept may require embodiments facilitating compression of the tubular structural member in more than one plane. For this purpose the invention contemplates not only the embodiment shown in FIG. 2 having one thick and one thin wall portion around the circumference of the tubular member, but embodiments with two, three or more pairs of thick and thin circumferentially spaced wall portions. In this respect FIGS. 3a, b and c of the drawings show a tubular structural member 30 which, for purposes of illustration, contains the same amount of the same material as the member 20. However, in this instance, the material is distributed in such a way that the member 30 has six pairs of thick and thin successively adjacent wall portions.

As shown, the member 30 is comprised of circumferentially spaced longitudinally extending wall sections 31 having approximately twice the thickness of relatively intermediate wall sections 32. It will be obvious from the drawings that the tubular element 30, by the inclusion of the relatively thin wall sections 32, is provided with a series of circumferentially spaced hinge portions, pairs of which have a generally opposite relation. This member can be compressed flat, as shown in FIG. 3b, and in a variety of planes as evidenced by FIG. 3c. In either instance, on compression the relatively thicker wall portions 31 relatively nest intermediately of each other. It is significant to note here also that though the member 30 uses the same amount of material, in cross section, as the member 10, the configuration of the wall of member 30 provides it with substantially greater stiffness in an extended condition. It is significant to here note that according to a further concept of the invention, a similar effect can be achieved by making the wall of the tubular member of substantially uniform thickness and, in forming the wall, providing that its inside contour, in a circumferential sense, alternately project to or recede from the center of the tubular member so formed. This alternative is shown to exist on removal of wall portions in a manner such as illustrated in FIGS. 11a and b of the drawings. In either case, flexing, wrapping, and twisting properties of the member 30, and in a compressed state, are generally equal to better than those of the member 10.

In accordance with the invention the configurations of tubular structural members as shown in FIGS. 2 and 3 of the drawings are such to facilitate the inclusion, in their relatively thicker wall portions, of elements with a higher elasticity modulus than that of the members per se without particularly affecting the radius over which the tubular structural members can be bent when compressed flat.

To illustrate, referring to FIGS. 4a and b of the drawings, a steel reinforcing tape 40 is incorporated in a tubular member 20' which otherwise has the nature and character of the member 20. This tape is embedded in the relatively thicker wall section 21', oriented to extend longitudinally of the member 20' and to lie in a plane when the member is compressed flat as seen in FIG. 4b. The plane of the tape is so arranged to occupy the so-called neutral zone of the flat configuration assumed by the member 20' when compressed. The inclusion of the reinforcement in this manner does not increase the smallest radius over which the flattened configuration can be bent provided, of course, that the thickness of the reinforcement 40 is held below certain limits governed by the physical properties of the materials involved. Instead of one tape, a number of adjacent tapes or wires may be embedded in the thicker wall portion 21' with similar results.

The same concept is evidenced in FIGS. 5a and b of the drawings wherein steel tape members 50 are incorporated in the relatively thicker wall sections 31' of the tubular member 30'. The member 30' otherwise structurally and physically corresponds to the member 30 previously described. Here again, when the member 30' is compressed flat, the tapes 50 occupy the so-called neutral zone.

FIGS. 6a and b of the drawings show a further modification of the embodiment of FIGS. 2a and b. In FIG. 6 a tubular member 60 is shown to include a tubular element 61 having a wall thickness equal to that of the thinner wall section 22 of the element 20. Sealingly fixed to cover substantially a half section of the inner wall of the element 61, in a transverse sense, is a transversely arcuate elongated member 40' which, for purposes of illustration, may be said to be of a spring steel. As may be seen from the drawings, the transverse extent of the member 40' is slightly less than half the circumferential extent of the inner surface of member 61 and its longitudinal extent is equal to that of the member 61. In this instance the element 40' has a thickness equal to the wall of the member 61. As incorporated it defines to each of its lateral extremities a hinge line 63 for the member 60, said hinge lines being generally diametrically opposed. The element 61 is again formed of the polypropylene material as previously described or a material similar in its physical characteristics in the areas noted.

Thus, the tubular element of FIGS. 6a and b affords, once more, a structure which can be compressed flat, the compression being accommodated by the hinge lines 63. It will be recognized from FIG. 6b that when the tubular structure 60 is compressed flat, element 40' occupies the neutral zone in the tape-like configuration which results. This means that the tape-like configuration retains the inherent capability of being wrapped around a small radius in the manner of the device of FIG. 2. As a matter of fact, when this form of embodiment is constructed, it has been found one may eliminate the portion of the member 61 which overlies the central longitudinally extending portion of the member 40'. This last is shown in FIGS. 12a and b. This can be done without materially affecting the capability of the inherently tubular member to resist bending, buckling and torsion when in a longitudinally extended state.

FIGS. 7a and 7b show a further modification of the invention unit as illustrated in FIGS. 3a and b, wherein the series of relatively spaced thicker wall portions facilitate compression in a number of planes. In this case, the inwardly projecting portions 50' of the wall 71 of a tubular structure 70 are achieved by application of separate reinforcing elements sealingly attached in circumferentially spaced relation on the inner wall of the tube. The wall 71 preferably is again of the polypropylene material previously described and basically uniform as to its thickness, which is equal to that of the wall sections 32. In this instance the elements 50' have a thickness equal to that of wall 71. When the unit so provided is compressed flat, as shown in FIG. 7b, the elements 50' occupy the neutral zone of the tape-like configuration which results. The elements 50' may have different physical characteristics than the material of which the wall 71 is formed, but, since they lie in the neutral zone when the wall is compressed flat, the wrapping capabilities of the resultant structure are retained. Elements 50' can add physical characteristics of a reinforcing or functional nature which supplement the inherent characteristics of the structural element 70. In any event, the latter remains inherently resistant to bending, buckling, or torsion when in a longitudinally extended uncompressed state.

Figure 12B:
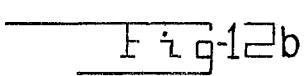

From the foregoing it becomes clear that, as shown by the embodiments of FIGS. 6, 7, and 12 the reinforcing elements may be attached to the inner wall of the tube member rather than embedded therein as in the case of the embodiments of FIGS. 4 and 5.

More generally, in reference to the modifications of FIGS. 4, 5, 6, 7 and 12 of the drawings it may thus be seen the invention contemplates foreign bodies may be included in any tubular member as provided by the present invention and in a manner that does not particularly affect its wrapping properties when compressed. The incorporated elements may be of such a nature to increase the basic mechanical strength of the tube when extended but they may also serve as electrical conductors, carry magnetic markings, or, if the tubular material is transparent carry graphic markings. Further, the foreign body or bodies may be in the nature of preformed springs which may induce self-wrapping of the invention embodiments when in the flattened state.

Referring now to FIGS. 8a, b and c of the drawings, a tubular element 80 of the nature illustrated in FIGS. 1a and b is shown to include flanges 82 projecting from its diametrically opposed hinge portions 81. As optionally illustrated one flange is shown to include gear teeth 83 while the other flange is shown to include longitudinally spaced perforations 84. Further, the element 80 is optionally shown to include apertures 85 at diametrically opposed longitudinally spaced positions and in a plane at right angles to that of its flanges. Now the member 80 may selectively have the teeth along one edge of a flange member, the perforations in one flange member or the perforations in its body per se or, in the alternative, a combination thereof may be had. Any one of these features converts the basic structure to an excellent projectable control element which obviously is quite versatile in application since any longitudinally extended portion will inherently maintain a rigidly controlled position. Of course, not only tubular members as shown in FIGS. 1a and b but any other invention embodiment of the basic tube may be similarly modified.

FIG. 9 of the drawings illustrates a tube 80 may be provided with apertures 85, applied as a push-pull control member and moved about a sprocket 90 without deterioration of its inherent physical characteristics. It will be recognized that the basic tubular structure compresses flat in moving over the sprocket 90 and inherently assumes a tubular form as it passes to and from the sprocket. The longitudinally extended tubular form portions of the push-pull member retain the physical characteristics of the basic tube to resist bending, buckling and torsion.

It will also be recognized that the tubular member will remain engaged with the sprocket even if pushing forces are transmitted around it. Of course, the sprocket can be replaced by a form fitting elbow piece if one just desires to guide the tubular member around a corner, and if some friction is not objectionable. The tubular member may also carry magnetic or graphic markings as previously described. The article of manufacture so provided is thus uniquely adapted as a control element which may be bent around corners without loss of its inherent rigidity for push-pull purposes.

Figure 10B:
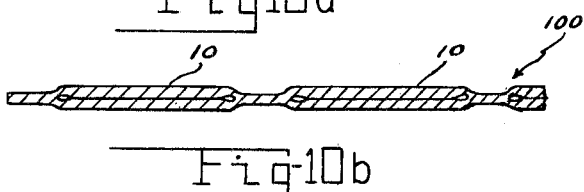
Figure 8C:
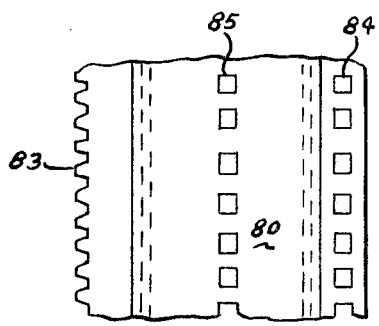
Figure 10C:
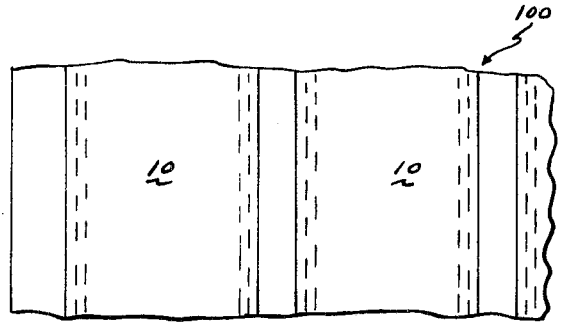

Referring to FIG. 10 of the drawings, it may be seen there that a series of tubular elements such as illustrated in FIGS. 1a and b may be joined in integrated side-by-side relation to achieve a board or panel-type structure 100. The elements of this structure are therefore capable of being mutually and simultaneously compressed flat and wrapped about a small radius for storage. On release from a wrapped condition, the elements respectively assume a tubular form to achieve a board or panel configuration. Of course, not only the tubular member shown in FIGS. 1a and b, but any other embodiment of the basic tube lends itself to this type structure.

It may thus be seen that the basic structural element as contemplated by the present invention may serve a unique purpose for a great variety of applications. It is to be recognized that the applications and form of embodiment of the invention concepts are many and the particular disclosure herein of specific embodiments and modifications is not to be construed as limiting their nature or scope.

In summary, the invention provides for a tubular structure of a highly economical nature which can be stored in a minimal space and be extended from, or retracted to, the stored condition by hand, or by power, or by its inherent forces to achieve a uniquely rigid structural or functional element. In its extended form, it can also be used as a push-pull control element for the transmission of motions around corners which requires no housing or support for straight portions, and which can engage sprockets and gears and can carry magnetic or graphic markings. Furthermore, the invention embodiments are capable of being inflated with gas or filled with fluid in any circumstances which so demand. They may also serve as collapsible tubular containers for crushable articles. Moreover, the devices which can result from the invention may readily be utilized as conductors for fluids, serve as insulating supports for electrically conductive elements and have a capacity to be given uniquely complex configurations without deterioration of their basic physical characteristics. As a matter of fact, particularly observing FIGS. 10a, b and c in conjunction with FIG. 9 of the drawings, not only does the invention enable a push-pull device which requires no housing or support for straight portions but it also contemplates a self-supporting conveyor belt.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention I claim:

1. A storable and extendable structural support medium comprising an elongated tubular member having a circumferentially continuous wall structure which is structurally rigid in an axial sense in its elongated tubular form, said wall structure being comprised in the circumferential sense of an even number of longitudinally extended successively thinner and thicker adjacent wall sections, said member having the physical capacity of being repeatedly flattened anywhere along its length in response to predetermined compressive forces being applied in a sense transverse to its longitudinal axis, thinner portions of said wall sections providing oppositely defined hinges on flattening of said wall structure and accommodating the repeated return of said wall structure to its elongated tubular form and the repeated flattening thereof without structural deterioration of said member, said wall structure in its flattened state providing that opposite halves thereof dispose in generally coextensive interlock free abutment, each said hinge being in immediately joining relation to a terminal extremity of a thicker wall section, said hinge portions so disposing that said wall structure including its hinge portions is rendered capable of being fully flattened throughout its transverse extent and in such flattened state capable of readily accommodating repeated bending and twisting as needs require, said member further having the physical capacity that on release thereof from the bent or twisted state and the removal of forces applied transverse to said longitudinal axis to reassume its tubular and elongated structurally rigid wall form.

2. A storable extendable structural support medium as in claim 1 characterized by the wall sections of said member being made of a resilient material to give flattened portions thereof the inherent capacity to return said tubular member to its original form when released from compression and, at that point, to resume a structurally rigid state.

3. A storable extendable structural support medium as in claim 1 characterized by at least a part of said wall sections of said member being formed to provide a longitudinally spaced succession of discontinuities in its exterior surface to produce thereby a gear-like engagement means to enable drive thereof as a motion transmitting device.

4. A storable extendable structural support medium as in claim 1 characterized by a longitudinally extended surface portion of at least one of said wall sections being formed to produce therein means defining a series of spaced openings to provide thereby for an engagement therewith of a gear or like drive means, in which event said tubular member may function as a motion transmitting medium.

5. An assembly of storable extendable structural support mediums as in claim 1 characterized by a plurality thereof being joined in side by side relation.

6. A storable and extendable structural support medium as in claim 1 characterized by the circumferential width of the thinner of the wall sections being greater than that of the thicker and providing in the instance of flattening said wall structure for superposition of an opposite thicker wall section in a relatively cupped relation thereto whereby to dispose the bulk of the thicker of the wall sections in the neutral plane of the flattened wall structure to thereby reduce to a minimum the resistance of flattened wall structure of said tubular member to bending and twisting.

7. A storable extendable structural support medium as in claim 6 characterized by said circumferentially continuous wall structure consisting of a plurality of said thinner and thicker wall sections which integrally connect, in a circumferential sense, in a successive alternating relation, whereby on application of said predetermined compressive flattening force in a sense transverse to the axis of said member, portions of a selective pair of said thinner sections serve to provide diametrically opposite hinges, and each of said thinner sections, as flattening is achieved, is arranged to freely cup a thicker wall section which superposes in the flattening process, as a result of which the superposed thicker wall sections have the bulk thereof projected into the neutral plane of the flattened portions of the member, reducing thereby the total rigidity of said member sufficiently to twist and bend flattened portions thereof about a small radius.

8. A storable extendable structural support medium as in claim 6 characterized by the thicker of said sections including at least one insert of a reinforcing type of material, which insert is so positioned that on flattening of said member as described, said insert disposes in the neutral plane of the flattened wall structure and is thereby placed in a position to reduce its stiffening effect on said tubular member to a minimum, enabling the twisting and the bending of flattened portions of said member about a small radius.

9. A storable extendable structural support medium as in claim 6 characterized by the thicker of said sections incorporating an insert of a metallic character so positioned that in a flattening of said tubular member said insert disposes in said neutral plane.

10. A storable and extendable structural support medium comprising an elongated tubular member which is structurally rigid in an axial sense in its elongated tubular form, said member consisting of a circumferentially continuous wall structure comprised in a circumferential sense of successively adjacent longitudinally extending wall sections of even number, at least the inner surfaces of successively adjacent wall sections being differentially spaced from the central axis of said tubular member, the inner surface of one of successively adjacent wall sections being projected in wardly toward said central axis and the inner surface of the other being displaced outwardly therefrom in a generally uniform manner, the outwardly displaced of said inner surfaces having a greater circumferential width than the inwardly projected of said inner surfaces, said member being formed to have the capacity to be repeatedly flattened anywhere along its length in response to predetermined compressive forces being applied transverse to its longitudinal axis and to inherently return to its rigid tubular form on release from compression, the lateral extremities of any wall section having an outwardly displaced inner surface being respectively adapted to provide a hinge directly at the terminal extremity of an adjacent wall section having an inwardly projected inner surface whereby said member can accommodate repeated flattening without the occurrence of structural deterioration, said member as so formed providing a structural arrangement that on application of said predetermined compressive force transverse to the longitudinal axis of said member and a flattening of a portion thereof, there will be a full flattening with the inwardly projecting inner wall surface portion of one wall section disposing in an interlock free cupped relation to the oppositely disposing wall section which will have the described outwardly displaced inner surface, the full flattening enabled thereby disposing the bulk of the inwardly projecting wall surface portion in the neutral plane of the flattened portion of said member, achieving a relative disposition of said sections which reduces to a minimum the resistance of the flattened portions to bending and twisting and enables that flattened portions may be readily twisted or bent as needs require, said member having the physical capacity that on release thereof from the bent or twisted state and the removal of compressive forces applied transverse to its longitudinal axis it will reassume its tubular and elongated structurally rigid wall form.

11. A storable extendable structural support medium as in claim 10 characterized by the wall sections of said member being made of a resilient material to give flattened portions thereof the inherent capacity to return said tubular member to its original form when released from compression and, at that point, to resume a structurally rigid state.

12. A storable extendable structural support medium as in claim 10, characterized by an inwardly projecting wall portion of said member including an element section including an insert of a reinforcing type material, which element is so positioned that on flattening of said member, as described, said element disposes in said neutral plane and is thereby placed in a position to reduce its stiffening effect on said tubular member to a minimum, enabling the twisting and the bending of flattened portions of said member about a small radius.

13. A storable extendable structural support medium as in claim 10 characterized by a wall section which provides an inwardly projected inner surface portion of said member including at least one longitudinally extending element of a metallic character so positioned that in a flattening of said member it will lie in said neutral plane.

14. A storable extendable structural support medium as in claim 10 characterized by said member having means arranged on its exterior in a longitudinal extending sense formed to provide for engagement thereof by a gear, to provide for the use of said tubular member as a motion transmitting device.

15. An assembly of storable extendable structural support mediums as in claim 10 characterized by a plurality thereof being joined in side by side relation.

16. A storable and extendable structural support medium comprising an elongated tubular member which is structurally rigid in an axial sense in its elongated tubular form, said member consisting of a circumferentially continuous wall structure comprised of successively adjacent longitudinally extending generally coextensive wall sections, successively adjacent of said sections being differentially formed to have at least their innermost surfaces, in circumferential sequence, alternately projected inwardly to and displaced outwardly from the central axis of said member, the section the inner surface of which is outwardly displaced having a circumferential width which is greater than that of the section having an inwardly projected inner surface, said member having the capacity to have any portion thereof repeatedly flattened in response to predetermined compressive forces being applied transverse to its longitudinal axis and to inherently return to its rigid tubular form on release from compression, the lateral extremities of a wall section having an outwardly displaced inner surface being adapted to selectively provide hinges at the terminal extremity of an adjacent wall section whereby to accommodate repeated flattening of said member without the occurrence of structural deterioration, said sections being so formed that on application of said predetermined compressive force transverse to the longitudinal axis of said member and a flattening of a portion of said member, in flattening each said outwardly displaced inner surface portion provides an interlock free cupping of an inwardly projected inner surface portion to thereby dispose the bulk provided by the latter in the neutral plane of the flattened portion of said member, whereby the relative disposition of said sections on flattening reduces to a minimum the resistance to bending and twisting, enabling thereby that said flattened portions may be readily twisted or bent as needs require, said member having the physical capacity that on release thereof from the bent or twisted state and the removal of forces applied transverse to its longitudinal axis to reassume its tubular and elongated structurally rigid wall form.

17. A storable and extendable structural support medium as in claim 16 characterized by successive of said wall sections being relatively displaced in respect to both their inner and their outer surfaces.

References Cited

UNITED STATES PATENTS

| | | | |
|---|---|---|---|
| 3,088,120 | 5/1963 | Gould | 2—216 |
| 3,158,181 | 11/1964 | Gore | 138—174 X |
| 1,616,063 | 2/1927 | Novotny et al. | 138—121 |

HENRY T. KLINKSIEK, Primary Examiner

U.S. Cl. X.R.

49—498; 52—720; 215—1; 220—1; 222—107